May 13, 1969   C. M. RAINEY   3,444,349
WELDING APPARATUS
Filed June 3, 1966
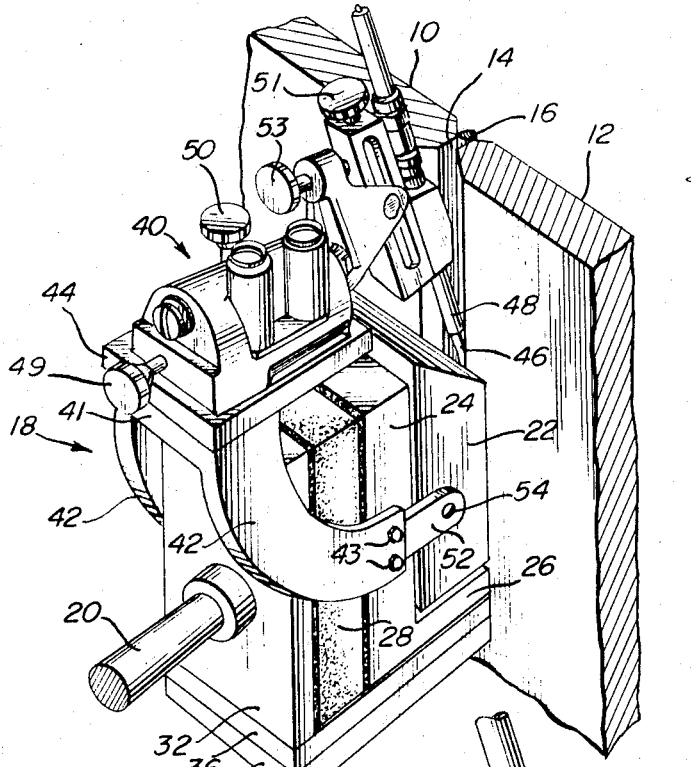
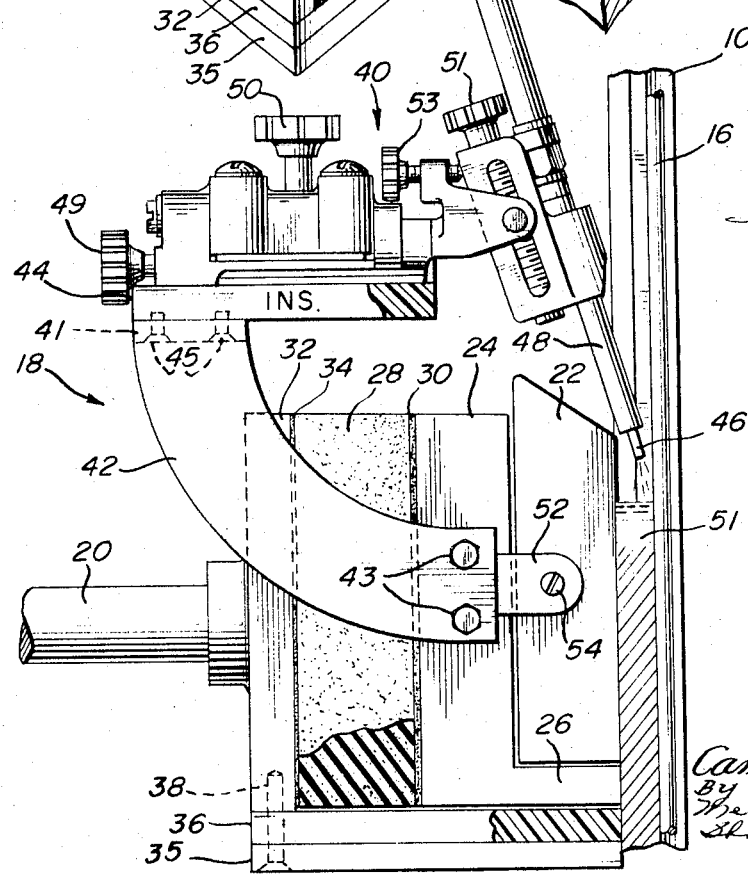
INVENTOR
Carl Max Rainey
BY
Merriam, Marshall,
Shapiro & Klose
ATTORNEYS

# United States Patent Office 3,444,349
Patented May 13, 1969

3,444,349
WELDING APPARATUS
Carl Max Rainey, Homewood, Ill., assignor to Chicago Bridge & Iron Company, Oak Brook, Ill., a corporation of Illinois
Filed June 3, 1966, Ser. No. 555,142
Int. Cl. B23k 9/12, 9/18
U.S. Cl. 219—126     3 Claims

ABSTRACT OF THE DISCLOSURE

Welding apparatus for butt welding a vertical joint between two substantially abutting vertical members, including a weld retaining rigid shoe bar spanning the joint, a platform extending below the shoe bar for supporting the shoe bar in position vertically along the joint, the platform having an upper surface with a low coefficient of friction enabling slidable lateral displacement of the shoe bar with respect to the platform, resilient means urging the shoe bar into yieldable slidable engagement with the vertical members and enabling the shoe bar to slidably displace along the low friction upper surface of the platform as variations or obstructions are encountered by the shoe bar along the joint and a wire guide device rigidly mounted to the shoe bar to maintain the relative position between the shoe bar and the welding wire during the welding operation.

---

This invention relates to a welding apparatus. In its more specific aspect, this invention relates to a welding shoe element for use in vertical butt welding of metal plates, particularly steel plates.

In the vertical butt welding of metal plates, the edges of the plates, which may be beveled on one or both sides, are placed in proximity to each other. A welding shoe bar is placed at the juncture between the plates, and the shoe bar is moved progressively upward while molten weld metal is deposited in the vertical groove which, upon solidification, joins the plates together. The face of the shoe bar is contoured to shape or limit the weld applied to the specific areas, and at least a portion of the face contacts the surfaces of the metal plates. This method is described in U.S. Letters Patent 3,210,520 to Arnold et al.

In vertical butt welding as described above, it is often difficult to achieve a relatively smooth and uniform weld. Defective weld areas are caused frequently by variations in the plate surfaces and/or the beveled edges, by misalignment of the plates, or by fit-up inaccuracies. Further, these difficulties can cause leakage of the molten weld past the shoe and out the side on which the weld is being deposited. These difficulties are particularly prevalent in constructing vessels of large dimensions and/or from heavy plates.

This invention has as its purpose to provide a welding shoe element which can compensate, during the welding operation, for these variations, misalignments or inaccuracies so that a relatively smooth and uniform weld is formed, and further provides means for controlling the pressure of the shoe bar against the plates and welding puddle of molten metal thereby eliminating leakage of the molten lead.

In general, the welding shoe element of my invention adaptable for use in welding substantially abutting members, includes bracket means supporting in position a weld retaining shoe bar with a facing for spanning a joint to be welded, and resilient means between the bracket means and the shoe bar for biasing the shoe bar into yieldable contact with the abutting members during movement of the shoe bar along the members in a welding operation.

In another aspect of this invention there is provided welding apparatus including means for locating and maintaining the weld wire, commonly used in welding, in fixed position relative to a movable shoe bar thus preventing shorting between the wire and other parts of the welding apparatus during movement of the shoe bar, and enabling the input heat from the welding arc to be evenly distributed between the abutting members.

The welding apparatus in this aspect of my invention is adaptable for use in welding substantially abutting members and includes a welding shoe element as described above, and a welding wire guide supported by the bracket means so that as the shoe bar moves laterally with respect to the abutting members, the welding wire guide moves in substantially identical lateral movement.

Reference is now had to the following detailed specification and preferred embodiments thereof, and to the accompanying drawings in which my invention is shown. In the drawings:

FIGURE 1 is a perspective view, partly fragmentary, showing the welding apparatus of this invention mounted for use in joining vertical plate members; and FIGURE 2 is an elevational view, partially in section, of the apparatus of FIGURE 1.

Referring to the drawings wherein like reference numerals refer to similar parts throughout, there is shown in FIGURE 1 vertical plates 10 and 12 to be welded together along the vertical joint 14. Desirably, the plate members are beveled along their vertical edges as shown in FIGURE 1, and it should be understood that the plate members may be either flat or curved. An elongated stationary back-up bar 16, having a diameter slightly larger than the gap at vertical joint 14, is tack welded along the vertical groove to both plate members.

Welding apparatus, indicated generally by the numeral 18, is placed along the sides of wall members 10 and 12, opposite the side having the back-up bar 16, and the welding apparatus is held in position by means of ram and support bar 20 which extends from a suitable supporting carriage (not shown). The welding apparatus 18 includes a welding shoe bar 22 having a facing which spans the joint to be welded and at least a portion of which is maintained in contact with the surfaces of wall members 10 and 12. The shoe bar is desirably made of metal which conducts heat rapidly, preferably copper, and is water-cooled internally by conventional means during welding operations. There is provided a first bracket means 24 disposed opposite the facing of the shoe bar. This bracket has a base 26 extending beneath the shoe bar 22. A resilient pad 28 such as of an elastic foam i.e. rubber sponge or polyurethane foam is affixed along one face thereof to bracket means 24 by a suitable adhesive 30. The opposite face of pad 28 is anchored to upstanding bracket means 32 by an adhesive 34, and said bracket means 32 is affixed to support bar 20. Base plate 35 having disposed on top thereof a slide member 36 desirably formed of polytetrafluoroethylene or other suitable material characterized by a low coefficient of friction, extend beneath shoe bar 22, first bracket means 24 including platform 26 and pad 28. The base plate 35 and slide member 36 are fastened to the second bracket means 32 by fastening means such as screw 38.

A wire guide device 40 is supported above the welding shoe bar 22 by bracket 41 having downwardly depending struts 42 which are connected to opposite sides of bracket 24 by means of screws 43. Insulating block 44 is attached with screws 45 to the bracket 41 and electrically insulates the wire guide device from the shoe bar. Welding wire 46, extending from a reel source and suitable drive means (not shown), passes through wire guide 40 for continuously feeding the wire through rigid wire guide tip 48 to the welding joint during the upwardly progressive movement of the shoe bar. Suitable adjusting means 49, 50, 51 and 53 are provided for adjusting the position of the tip of wire 46 in such a manner that the input heat is evenly distributed between the plates 10 and 12.

Struts 42 are each provided with a horizontal extension 52 which extend beyond bracket 24 and along at least a portion of the opposite side walls of shoe bar 22. Set screw 54 is provided for adjustably mounting the shoe bar on extensions 52 and above platform 26. Thus, it can be seen that the welding wire 46 is maintained in a fixed relative position with respect to the shoe bar so that the shoe bar and welding wire move in unison, thereby preventing short circuiting of the weld wire to the shoe bar or to the plate members. Short circuiting of the welding arc to the shoe could cause the copper of the shoe bar to melt which necessitates a time consuming process of burning the copper out from the weld and further results in destruction of the shoe.

In operation, the welding apparatus advances progressively upward. The welding wire fed to the joint by means of a wire drive mechanism through guide 40 and wire tip guide 48 is continuously melted by electrical power means to form weld puddle 51, which fuses together the abutting edges of metal plate members 10 and 12 and upon solidification welds the plate members together. The pad 28 urges the shoe bar 22 outwardly into intimate but yieldable pressure contact with the surfaces of plate members 10 and 12, and any variations, obstructions, inaccuracies or the like in the plate members are compensated for by lateral i.e. horizontal movement of the shoe bar in and out relative to the joint to be welded. In the event of a variation in thickness in one or both plate members, for example, the shoe bar slides laterally to compress or expand the pad while maintaining the facing of the shoe bar in contact with the surfaces of the plate members thereby compensating for the variation or inaccuracy. It thus will be observed that the welding shoe element of my invention provides for controlled contact of the shoe bar against the plate members and weld puddle thereby minimizing or eliminating defective weld areas in the joint. Also, the welding shoe element provides a shock absorbing action for the welding apparatus in the event the shoe bar hits an obstruction on the surface of the plate members. As a still further advantage of the invention, the wire tip is maintained in a fixed position with respect to the shoe bar to provide even heat distribution and non-shorting of the wire tip during welding apparatus movements.

The foregoing detailed description has been given for clearness of understanding only, and no unnecessary limitations should be understood therefrom, as modification will be obvious to those skilled in the art.

What is claimed is:

1. In automatic welding apparatus for butt welding a vertical joint between two substantially abutting vertical members, the improvement comprising:
    a weld retaining rigid shoe bar having a facing spanning the joint and slidably engaging said vertical members during vertical movement of said rigid shoe bar in welding the joint;
    a movable platform extending below said shoe bar supporting said shoe bar in position vertically along the joint;
    said platform having an upper surface characterized by a low coefficient of friction enabling slidable lateral displacement of said shoe bar with respect to said platform;
    vertical drive means including a bracket rigidly attached to said platform and spacially separated from said shoe bar for moving said platform and shoe bar vertically along said joint;
    resilient means between said first bracket and said shoe bar for urging said shoe bar into yieldable slidable engagement with said vertical members;
    said resilient means enabling said rigid shoe bar to slidably displace laterally along said low friction upper surface of said platform as variations or obstructions are encountered by said shoe bar along said joint; and
    a wire guide device for guiding said welding wire, said wire guide device rigidly mounted to said shoe bar and following said slidable lateral displacement of said shoe bar to maintain the relative position between said shoe bar and said weld wire during the welding operation.

2. In welding apparatus as claimed in claim 1, including electrical insulating means intermediate said wire guide device and said shoe bar for electrically insulating the wire guide device from the shoe bar.

3. In welding apparatus as claimed in claim 1, including a mounting block rigidly attached to said shoe bar intermediate said resilient means and said shoe bar, said mounting block including a portion extending below said shoe bar intermediate said shoe bar and said platform upper surface and immediately adjacent thereto, said mounting block slidably displacing on said platform in response to similar moves of said shoe bar.

References Cited
UNITED STATES PATENTS

| | | | |
|---|---|---|---|
| 2,331,937 | 10/1943 | Schreiner | 219—160 |
| 2,678,987 | 5/1954 | Talley | 219—126 |
| 2,997,571 | 8/1961 | Smout | 219—126 |
| 3,046,386 | 7/1962 | Wooding et al. | 219—126 |
| 3,170,430 | 2/1965 | Bistak | 219—126 |
| 3,211,887 | 10/1965 | Cotterman | 219—126 |
| 3,219,250 | 11/1965 | Drummond | 219—160 |
| 3,229,068 | 1/1966 | Hasegawa | 219—126 |
| 3,229,884 | 1/1966 | Franklin et al. | 219—160 |
| 3,251,526 | 5/1966 | Agnew et al. | 219—126 |

RICHARD M. WOOD, *Primary Examiner.*

W. DEXTER BROOKS, *Assistant Examiner.*

U.S. Cl. X.R.

219—73